(12) United States Patent
Kapparos et al.

(10) Patent No.: US 7,677,028 B2
(45) Date of Patent: Mar. 16, 2010

(54) PARTICULATE TRAP REGENERATION TEMPERATURE CONTROL SYSTEM

(75) Inventors: David J. Kapparos, Chillicothe, IL (US); Michael D. Lowe, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 1035 days.

(21) Appl. No.: 11/363,245

(22) Filed: Feb. 28, 2006

(65) Prior Publication Data

US 2007/0199312 A1 Aug. 30, 2007

(51) Int. Cl.
    *F01N 3/025* (2006.01)
(52) U.S. Cl. .......................................... 60/286; 60/295
(58) Field of Classification Search ................. 60/286, 60/295, 297, 303
    See application file for complete search history.

(56) References Cited

U.S. PATENT DOCUMENTS

| | | | |
|---|---|---|---|
| 3,911,675 A | 10/1975 | Mondt | |
| 4,608,640 A | 8/1986 | Shinzawa et al. | |
| 4,897,096 A | 1/1990 | Pischinger et al. | |
| 5,287,698 A | 2/1994 | Shinzawa et al. | |
| 5,457,957 A | 10/1995 | Härtel et al. | |
| 5,716,586 A * | 2/1998 | Taniguchi | 422/173 |
| 5,802,844 A | 9/1998 | Lee et al. | |
| 6,235,247 B1 | 5/2001 | Maganas et al. | |
| 6,622,480 B2 | 9/2003 | Tashiro et al. | |
| 6,729,128 B2 | 5/2004 | Shiratani et al. | |
| 6,735,941 B2 | 5/2004 | Saito et al. | |
| 6,829,889 B2 | 12/2004 | Saito et al. | |

(Continued)

FOREIGN PATENT DOCUMENTS

DE 10144958 3/2003

(Continued)

OTHER PUBLICATIONS

PCT International Search Report; PCT/US2007/002867; International Filing Date: Feb. 2, 2007; Applicant: Caterpillar Inc.

*Primary Examiner*—Thomas E Denion
*Assistant Examiner*—Jonathan Matthias
(74) *Attorney, Agent, or Firm*—Finnegan, Henderson, Farabow, Garrett & Dunner

(57) ABSTRACT

In one aspect, the present disclosure is directed to a particulate trap regeneration temperature control system. The system may include a particulate trap configured to remove one or more types of particulate matter from an exhaust flow of an engine. The system may also include a heating system configured to increase the temperature of the particulate trap. The system may further include a controller configured to control operation of the heating system during execution of a thermal regeneration event of the particulate trap. The controller may control operation of the heating system by effectuating a first temperature increase of the particulate trap at a predetermined rate up to a first predetermined temperature. The controller may also be configured to effectuate a first temperature hold by maintaining the temperature of the particulate trap at the first predetermined temperature for a predetermined amount of time. The controller may further be configured to effectuate a second temperature increase of the particulate trap at a predetermined rate to a higher second predetermined temperature. In addition, the controller may also be configured to effectuate a second temperature hold by maintaining the temperature of the particulate trap at the second predetermined temperature for a predetermined amount of time.

19 Claims, 4 Drawing Sheets

U.S. PATENT DOCUMENTS

| | | |
|---|---|---|
| 6,865,884 B2 | 3/2005 | Braun et al. |
| 6,868,667 B2 | 3/2005 | Surnilla |
| 6,901,751 B2 | 6/2005 | Bunting et al. |
| 6,910,329 B2 | 6/2005 | Bunting et al. |
| 2003/0145582 A1 | 8/2003 | Bunting et al. |
| 2003/0230078 A1* | 12/2003 | Yahata et al. ............ 60/295 |
| 2005/0120712 A1 | 6/2005 | Tsutsumoto et al. |
| 2005/0150219 A1 | 7/2005 | Crawley et al. |
| 2005/0166582 A1* | 8/2005 | Gotou ............ 60/297 |

FOREIGN PATENT DOCUMENTS

| | | |
|---|---|---|
| EP | 1426591 | 6/2004 |
| EP | 1431530 | 6/2004 |
| FR | 2860034 | 3/2005 |
| GB | 2397539 | 7/2004 |
| WO | WO 2007053367 A2 * | 5/2007 |

* cited by examiner

PARTICULATE TRAP REGENERATION TEMPERATURE CONTROL SYSTEM

TECHNICAL FIELD

The present disclosure is directed to a particulate trap regeneration system and, more particularly, to a particulate trap regeneration temperature control system.

BACKGROUND

Engines, including diesel engines, gasoline engines, natural gas engines, and other engines known in the art, may exhaust a complex mixture of air pollutants. The air pollutants may be composed of both gaseous and solid material, such as, for example, particulate matter. Particulate matter may include ash and unburned carbon particles called soot.

Due to increased environmental concerns, exhaust emission standards have become more stringent. The amount of particulate matter and gaseous pollutants emitted from an engine may be regulated depending on the type, size, and/or class of engine. In order to meet these emissions standards, engine manufacturers have pursued improvements in several different engine technologies, such as fuel injection, engine management, and air induction, to name a few. In addition, engine manufacturers have developed devices for treatment of engine exhaust after it leaves the engine.

Engine manufacturers have employed exhaust treatment devices called particulate traps to remove the particulate matter from the exhaust flow of an engine. A particulate trap may include a filter designed to trap particulate matter. The use of the particulate trap for extended periods of time, however, may enable particulate matter to accumulate on the filter, thereby causing damage to the filter and/or a decline in engine performance.

One method of restoring the performance of a particulate trap may include regeneration. Regeneration of a particulate trap filter system may be accomplished by thermal regeneration, which may include increasing the temperature of the filter and the trapped particulate matter above the combustion temperature of the particulate matter, thereby burning away the collected particulate matter and regenerating the filter system. This increase in temperature may be effectuated by various means. For example, some systems employ a heating element (e.g., an electric heating element) to directly heat one or more portions of the particulate trap (e.g., the filter medium or the external housing). Other systems have been configured to heat the exhaust gases upstream from the particulate trap, allowing the flow of the heated gases through the particulate trap to transfer heat to the particulate trap. For example, some systems may alter one or more engine operating parameters, such as air/fuel mixture, to produce exhaust gases with an elevated temperature. Running an engine with a "rich" air/fuel mixture can elevate exhaust gas temperature. Other systems heat the exhaust gases upstream from the particulate trap, with the use of a burner that creates a flame within the exhaust conduit leading to the particulate trap.

The rate of soot oxidation during thermal regeneration of particulate traps determines how long a regeneration event must be. One controllable factor that influences the soot oxidation rate is the temperature of exhaust gases entering the particulate trap (i.e., inlet temperature). Higher inlet temperatures may result in faster soot oxidation rates. Faster soot oxidation rates may facilitate shorter regeneration events, which may have less of an impact on fuel efficiency (e.g., a burner type regeneration device would have to burn for shorter duration and thus use less fuel). However, inlet temperatures that are too high may cause damage to the particulate trap, not only because of the high temperatures of the gases entering the particulate trap, but also because of the resulting effect on the soot oxidation rate.

Soot oxidation rate is exponentially dependent on temperature and is thus sensitive to high temperatures as well as rapid temperature increases. Soot oxidation is an exothermic reaction that produces more heat the faster the reaction takes place. Therefore, soot oxidation rates that are too high may cause production of enough heat to cause damage to the particulate trap or other parts of the system, as well as diminish the performance of one or more components of the system. Additionally, high temperatures and/or rapid increases in temperature may also result in uncontrollable soot oxidation rates (sometimes referred to as "unstable regeneration").

Unstable regeneration may include incineration/oxidation of accumulated particulate matter that occurs too quickly, which may result in particulate trap temperatures that can be high enough to damage the filter medium and/or other components of the system. That is, when temperatures get high enough, soot oxidation rates climb, resulting in production of enough heat from the exothermic reaction to perpetuate the soot oxidation rate even more. The reaction may burn particulates out of control until the particulate matter, which is the fuel for the burn, is consumed regardless of whether any regenerative thermal input is being made (e.g., whether a burner is being fired to heat exhaust gases upstream from the particulate trap). The uncontrollable burn may result in temperatures that are high enough to cause damage and/or a loss in performance as discussed above.

Thermal regeneration may be performed periodically as opposed to constantly. For example, one such regeneration system is disclosed by U.S. Patent Application Publication No. US 2003/0145582 by Bunting et al., published on Aug. 7, 2003 ("the '582 document"). The '582 document discloses a regeneration system configured to initiate regeneration periodically by varying the transmission shift points and/or varying the ratio of engine power to battery power. Both methods have the effect of varying the temperature of the exhaust produced by the engine.

While the system of the '582 document may provide for increased particulate trap temperatures and thereby thermal regeneration, the system does not employ a control strategy that protects against unstable regeneration. The '582 document does not disclose any ramping of particulate trap temperature or incremental temperature increases. Rather, the '582 document discloses sharply increasing the particulate trap temperature to a target regeneration temperature without regard for how quickly it reaches that target temperature.

The present disclosure is directed to solving one or more of the problems discussed above.

SUMMARY OF THE INVENTION

In one aspect, the present disclosure is directed to a particulate trap regeneration temperature control system. The system may include a particulate trap configured to remove one or more types of particulate matter from an exhaust flow of an engine. The system may also include a heating system configured to increase the temperature of the particulate trap. The system may further include a controller configured to control operation of the heating system during execution of a thermal regeneration event of the particulate trap. The controller may control operation of the heating system by effectuating a first temperature increase of the particulate trap at a predetermined rate up to a first predetermined temperature. The controller may also be configured to effectuate a first temperature hold by maintaining the temperature of the particulate trap at the first predetermined temperature for a predetermined amount of time. The controller may further be configured to effectuate at least a second temperature increase of the particulate trap at a predetermined rate to a higher second predetermined temperature. In addition, the controller may also be configured to effectuate at least a second temperature hold by maintaining the temperature of the particulate trap at the second predetermined temperature for a predetermined amount of time.

In one aspect, the present disclosure is directed to a method of regenerating a particulate trap configured to remove one or more types of particulate matter from an exhaust flow of an engine. The method may include executing a thermal regeneration event. Executing the event may include performing a first temperature increase of the particulate trap at a predetermined rate up to a first predetermined temperature. Executing the event may also include performing a first temperature hold by maintaining the temperature of the particulate trap at the first predetermined temperature for a predetermined amount of time. Executing the event may further include performing at least a second temperature increase of the particulate trap at a predetermined rate to a higher second predetermined temperature. In addition, executing the event may include performing at least a second temperature hold by maintaining the temperature of the particulate trap at the second predetermined temperature for a predetermined amount of time.

DETAILED DESCRIPTION

Reference will now be made in detail to the drawings. Wherever possible, the same reference numbers will be used throughout the drawings to refer to the same or like parts.

Figure 1:
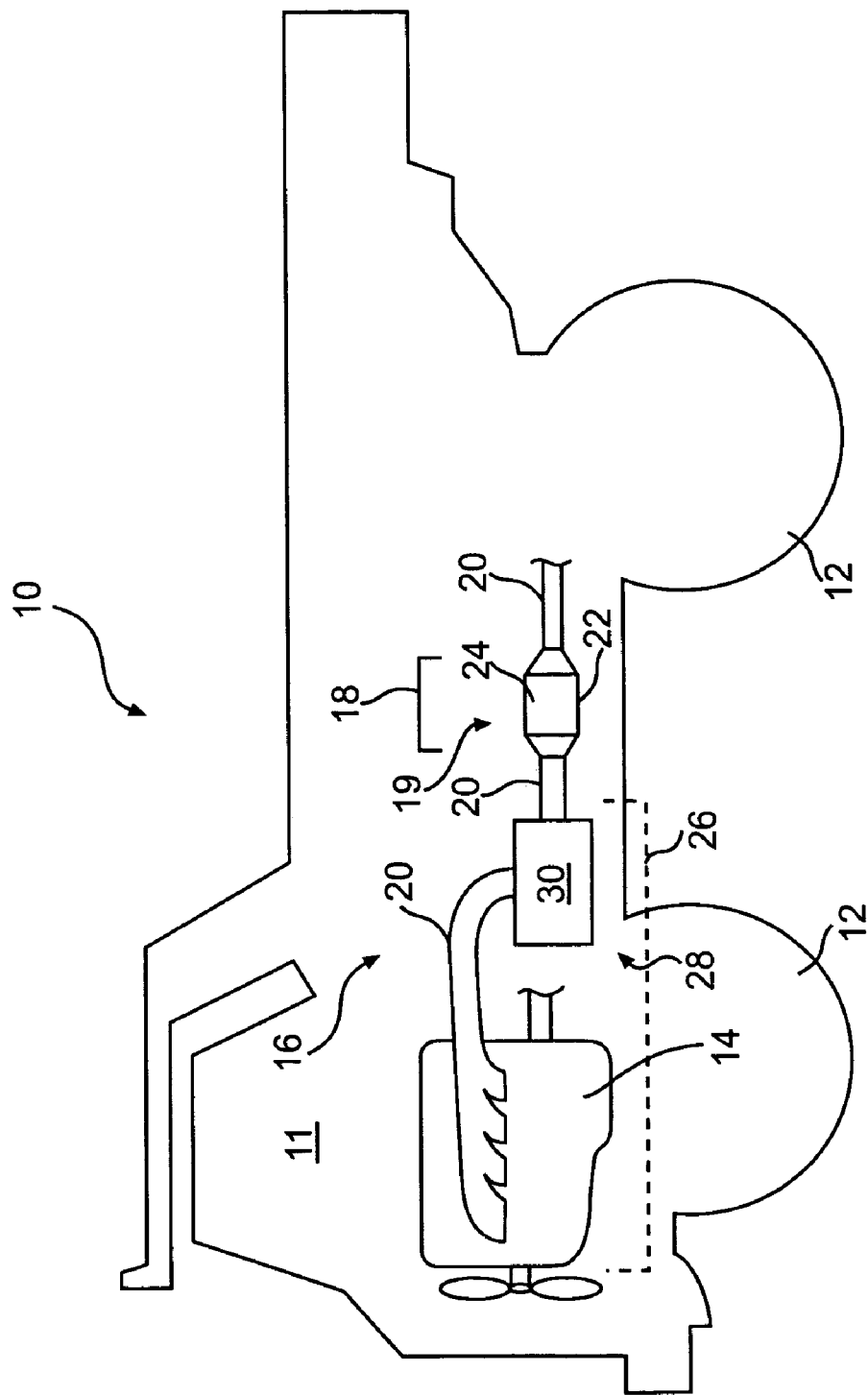
FIG. 1 is a diagrammatic illustration of a machine according to an exemplary disclosed embodiment.

FIG. 1 illustrates a machine 10. Machine 10 may include an operator station 11, one or more traction devices 12, an engine 14, and a particulate trap regeneration temperature control system 16.

Although machine 10 is shown as a truck, machine 10 could be any type of machine having an exhaust producing engine. Accordingly, traction devices 12 may be any type of traction devices, such as, for example, wheels, as shown in FIG. 1, tracks, belts, or any combinations thereof.

Engine 14 may be any kind of engine that produces an exhaust flow of exhaust gases. For example, engine 14 may be an internal combustion engine, such as a gasoline engine, a diesel engine, a natural gas engine or any other exhaust gas producing engine.

System 16 may include an after-treatment device 18. After-treatment device 18 may be any type of device configured to remove one or more constituents from the exhaust flow of engine 14. In some embodiments, after-treatment device 18 may be regenerated by heat or some other measure. In one embodiment, after-treatment device 18 may include a particulate trap 19. Particulate trap 19 may be configured to remove one or more types of particulate matter from the exhaust gases produced by engine 14 and flowing through an exhaust conduit 20 configured to direct all or a portion of the exhaust gases produced by engine 14 to after-treatment device 18. Particulate trap 19 may include an outer housing 22, which may encase a filter medium 24 (e.g. a metal mesh or screen, or a porous ceramic material, such as cordierite) configured to remove (i.e., trap) one or more types of particulate matter from the exhaust flow of engine 14.

Although after-treatment device 18 is discussed herein primarily as being a particulate trap, in other embodiments, after-treatment device 18 may include multifunctional devices such as a combination of a catalytic converter and a particulate trap in the same unit or a catalytic particulate trap, wherein filter medium 24 may include a catalytic material and/or a catalytic coating.

After-treatment device 18 may be configured to be thermally regenerated. System 16 may include a heating system 26, which may be configured to increase the temperature of after-treatment device 18 (e.g., particulate trap 19). There are a number of different ways that heating system 26 may be configured to do this. For example, heating system 26 may be configured to apply heat directly to after-treatment device 18 via a heating device integral with or adjacent to after-treatment device 18. An example of such a heating device may include an electric heating element (not shown).

Alternatively or additionally, heating system 26 may be configured to increase the temperature of after-treatment device 18 by transferring heat to after-treatment device 18 from the exhaust gases flowing through it. In such embodiments, heating system 26 may be configured to apply heat to exhaust gases upstream from after-treatment device 18. Heating system 26 may increase the temperature of exhaust gases in one or more ways. For example, altering engine parameters may have an effect on exhaust gas temperature. Running engine 14 with a "rich" air/fuel mixture may increase exhaust gas temperature. Increases in engine speed and/or load may also increase exhaust gas temperature. Timing and exhaust valve actuation may also be manipulated to control exhaust gas temperatures. Exhaust gases may also be heated by post injection, which involves injecting additional fuel into the combustion chambers after the combustion has taken place, which may result in the additional fuel being burned in the exhaust system, thereby elevating the temperature of the exhaust gases in the system.

Exhaust temperature may also be raised by heating the exhaust gases or exhaust conduit 20. For example, heating system 26 may include one or more heating devices such as an electric heating element and/or flame producing burner, which may be configured to heat the exhaust gases or exhaust conduit 20. In one embodiment, heating system 26 may include a regeneration device 28 configured to reduce an amount of particulate matter in after-treatment device 18. In an exemplary embodiment, regeneration device 28 may include a burner assembly 30 configured to increase the temperature of the exhaust gases flowing through exhaust conduit 20 upstream from after-treatment device 18. Burner assembly 30 may be configured to maintain or restore the performance of after-treatment device 18 through thermal regeneration.

Accumulation of exhaust flow constituents in after-treatment device 18 may result in a decline in engine performance and/or possible damage to after-treatment device 18 and/or other components of system 16. Burner assembly 30 may be configured to prevent or restore any decline in engine performance and avoid possible damage to after-treatment device 18 and/or other components of system 16. For example, burner assembly 30 may be configured to cause at least some of the particulate matter that may have accumulated in after-treatment device 18 to be burned off.

Although system 16 is shown with a single after-treatment device 18 and a single regeneration device 28, system 16 may include more than one after-treatment device 18 and/or more than one regeneration device 28. For example, in one embodiment, system 16 may include a single regeneration device 28 configured to regenerate two after-treatment devices. In another embodiment, system 16 may include two regeneration devices configured to regenerate two after-treatment devices. In such an embodiment, each regeneration device may be configured to regenerate one of the after-treatment devices or contribute to the regeneration of both of the after-treatment devices. System 16 could also include any number of regeneration devices and/or after-treatment devices in any combination suitable for regeneration.

Figure 2:
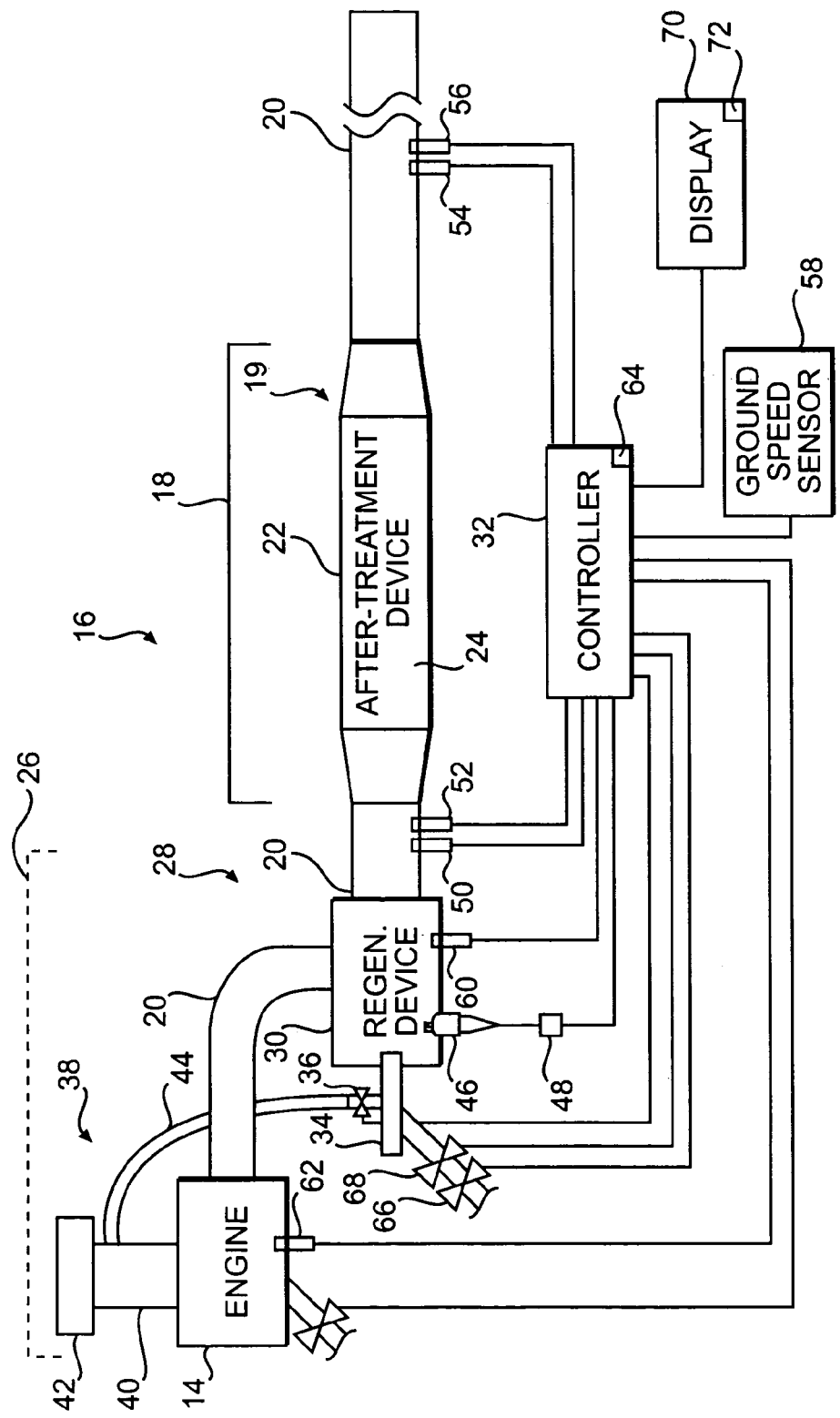
FIG. 2 is a diagrammatic illustration of a particulate trap regeneration temperature control system according to an exemplary disclosed embodiment.

FIG. 2 illustrates an exemplary embodiment of particulate trap regeneration temperature control system 16. For purposes of the following explanation, after-treatment device 18 will be discussed as being particulate trap 19, while regeneration device 28 will be discussed as being burner assembly 30. However, it should be noted that after-treatment device 18 and regeneration device 28 could be any of the disclosed types of after-treatment and regeneration devices mentioned above. System 16 may also include a controller 32 configured to receive information from various sources and control one or more components of system 16 based on this information.

Burner assembly 30 may be positioned anywhere along exhaust conduit 20 between engine 14 and particulate trap 19. Burner assembly 30 may include a fuel injector 34 configured to supply fuel to burner assembly 30. Burner assembly 30 may be configured to create a flame, which may be in a heat exchange relationship with the exhaust flow. System 16 may be configured to supply fuel injector 34 with fresh air for mixing with the fuel for combustion, as well as for flushing fuel injector 34 of any fuel or debris before and/or after operation of burner assembly 30. The supply of air to fuel injector 34 may be regulated by an air valve 36, controllable by controller 32.

In some embodiments, the source of the fresh air may be an air intake system 38 of engine 14. That is, air may be routed from a portion of air intake system 38, such as an intake manifold 40, downstream from a compressor 42 configured to create forced induction for engine 14. Compressor 42 may include a turbocharger, supercharger, or any other device configured to compress intake air and thereby produce forced induction for engine 14. Air may be directed from intake manifold 40 to fuel injector 34 via an air conduit 44. The supply of air to fuel injector 34 may be regulated by air valve 36, which may be controllable by controller 32 as discussed above.

Burner assembly 30 may also include a spark plug 46 configured to provide spark to ignite the air/fuel mixture delivered by fuel injector 34. Current may be supplied to spark plug 46 by an ignition coil 48, which may be controllable by controller 32. Although burner assembly 30 has been shown and described as including spark plug 46, alternative ignition sources may be employed, such as, for example, glow plugs or any other means for igniting an air/fuel mixture.

Controller 32 may include any means for receiving machine operating parameter-related information and/or for monitoring, recording, storing, indexing, processing, and/or communicating such information. These means may include components such as, for example, a memory, one or more data storage devices, a central processing unit, or any other components that may be used to run an application.

Although aspects of the present disclosure may be described generally as being stored in memory, one skilled in the art will appreciate that these aspects can be stored on or read from types of computer program products or computer-readable media, such as computer chips and secondary storage devices, including hard disks, floppy disks, optical media, CD-ROM, or other forms of RAM or ROM. Various other known circuits may be associated with controller 32, such as power supply circuitry, signal-conditioning circuitry, solenoid driver circuitry, communication circuitry, and other appropriate circuitry.

Controller 32 may perform multiple processing and controlling functions, such as, for example, engine management (e.g., controller 32 may include an engine control module, a.k.a. an ECM), determining particulate loading, and controlling regeneration of particulate trap 19. Alternatively, machine 10 may include multiple controllers (a configuration not shown), each dedicated to perform one or more of these or other functions. Such multiple controllers may be configured to communicate with one another.

Controller 32 may be further configured to activate regeneration device 28 in response to a determination that more than a predetermined amount of particulate matter is or may be trapped in filter medium 24. Controller 32 may also be configured to activate regeneration device 28 in response to one or more other trigger conditions. These other trigger conditions may include, for example, operation of engine 14 for a predetermined amount of time; consumption of a predetermined amount of fuel by engine 14; detection of an elevated backpressure upstream of particulate trap 19 above a predetermined pressure; detection of a pressure differential across particulate trap 19 of greater than a predetermined amount; and a determination that a calculated or measured amount of particulate matter accumulated in particulate trap 19 is above a predetermined amount.

Regeneration may also be initiated manually by an operator, owner, service technician, etc. of machine 10. Manually triggering regeneration may be accomplished via a switch, button, or the like associated with machine 10 and/or a service tool configured to interface with machine 10.

System 16 may include various sensors configured to generate information about operating parameters of system 16. Such information may be received by controller 32. For example, system 16 may include an upstream temperature sensor 50, an upstream pressure sensor 52, a downstream temperature sensor 54, and a downstream pressure sensor 56. Such sensors may be positioned along exhaust conduit 20 upstream and downstream from particulate trap 19 respectively and configured to take measurements of the temperature and pressure of the exhaust gases within exhaust conduit 20 at their respective locations. Such measurements may be received by controller 32.

Upstream pressure sensor 52 and downstream pressure sensor 56 may constitute a pressure differential measurement system. Such a system may be configured to measure a pressure differential between an upstream pressure of the exhaust flow upstream from particulate trap 19 and a downstream pressure of the exhaust flow downstream from particulate trap 19. Alternatively, in lieu of upstream pressure sensor 52 and downstream pressure sensor 56, the pressure differential measurement system may include a single pressure differential sensor (not shown) configured to measure the difference in pressure between the exhaust flow upstream and downstream of particulate trap 19.

System 16 may also include a ground speed sensor 58 configured to monitor the ground speed of machine 10 (i.e., the speed of machine 10 relative to the surface over which it travels). System 16 may also be provided with a flame sensing system associated burner assembly 30 and configured to detect whether burner assembly 30 is currently producing a flame. Such a flame sensing system may include, for example, a flame sensor 60. In addition, system 16 may include an engine speed sensor 62 configured to measure the speed at which engine 14 is operating (i.e., rpm).

The aforementioned sensors may include any type of sensing means suitable for monitoring their respective parameters. In particular, flame sensor 60 may include any type of sensor suitable for detecting the presence of a flame, such as temperature sensors (e.g., thermocouples), optical sensors, ultraviolet sensors, and ion sensors. Flame sensor 60 may be configured to detect a condition (e.g., temperature, ultraviolet light, ions, etc.) in proximity to the flame. Such a condition may be monitored at any location within close enough proximity to the flame to enable the presence of the flame to be detected. Additionally or alternatively, the flame sensing system may be configured to detect a rate of change in the condition. For example, a temperature in proximity to the flame location that is increasing at a predetermined rate may indicate that a flame is lit and causing the increase In addition or as an alternative to flame sensor 60, upstream temperature sensor 50 may be located upstream of burner assembly 30. In such an embodiment the flame sensing system may be configured to determine whether the downstream exhaust temperature measured by downstream temperature sensor 54 exceeds the upstream exhaust temperature measured by upstream temperature sensor 50 by a predetermined amount. A significantly higher downstream temperature may indicate that the flame is lit and is thus heating exhaust gases as they flow through burner assembly 30.

Controller 32 may include a timing device 64. Controller 32 may be configured to couple information from timing device 64 with information from other sources. For example, controller 32 may utilize information from timing device 64 in conjunction with information regarding operation of engine 14 (e.g., from engine speed sensor 62) to determine how long engine 14 is operated. Timing device 64 may also be used to monitor and control duration of regeneration events or any other operating parameters of system 16 and/or machine 10.

System 16 may be configured to control one or more additional system functions and/or parameters. Controller 32 may be configured to control the pressure of the fuel delivered to fuel injector 34 (and therefore the rate of fuel injection). A fuel on/off valve 66, which may be controllable by controller 32, may be associated with fuel injector 34 to selectively allow fuel to be delivered to fuel injector 34. In addition to fuel on/off valve 66, system 16 may also include a fuel pressure regulator valve 68 controllable by controller 32 to regulate the pressure of the fuel, and thereby the rate at which fuel is delivered to fuel injector 34. In some embodiments, controller 32 may be configured to control the pressure of fuel delivered to fuel injector 34 in a closed loop fashion, i.e., in response to pressure measurements taken at or near fuel injector 34 (e.g., by a fuel pressure sensor, not shown).

Controller 32 may be further configured to control fuel on/off valve 66 and/or fuel pressure regulator valve 68 (i.e., flow of fuel to fuel injector 34) in response to other parameters of system 16. For example, controller 32 may be configured to control the temperature of exhaust gases entering particulate trap 19 in response to feedback from upstream temperature sensor 50. This upstream exhaust temperature may be controlled by regulating the amount of fuel and/or air supplied to fuel injector 34, which may be accomplished by controlling fuel on/off valve 66 and/or fuel pressure regulator valve 68. Other types of regeneration devices or methods may be controlled in response to measurements taken by upstream temperature sensor 50. For example, the amount of post injection may be varied (e.g., by controller 32) to control the temperature of the exhaust gases entering any kind of aftertreatment device 18.

System 16 may include multiple fuel pressure regulator valves, which may be independently controlled. At least one fuel pressure regulator valve 68 may be configured to regulate main fuel pressure, and a second fuel pressure regulator valve (not shown) may be configured to regulate pilot fuel pressure. Pilot fuel pressure may be used during a pilot mode in which system 16 utilizes a predetermined air/fuel mixture to prevent flameouts during various engine operating conditions, e.g., hard accelerations and rapid decelerations.

Other operating parameters of system 16 may be monitored to maintain and/or optimize control of the regeneration process. For example, downstream temperature sensor 54 may detect whether downstream exhaust temperature is above a predetermined temperature. If downstream exhaust temperatures get too high, it could be an indication that temperatures within particulate trap 19 may be at an undesirably high level as well and/or that the regeneration may be somewhat unstable (e.g., incineration of particulate matter and/or a catalyst driven reaction may be intensifying within aftertreatment device 18 beyond a level commanded by controller 32).

System 16 may also be configured to monitor the stability of the regeneration process by determining a difference between the upstream exhaust temperature measured by upstream temperature sensor 50 and the downstream exhaust temperature measured by downstream temperature sensor 54. If the temperature measured by downstream temperature sensor 54 exceeds that measured by upstream temperature sensor 50 by more than a predetermined amount for more than a predetermined amount of time, controller 32 may initiate steps to scale back or terminate the regeneration process. For example, in such a case, controller 32 may reduce the intensity of the flame produced by burner assembly 30. In some circumstances, controller 32 may terminate the regeneration process if the regeneration process is significantly unstable. For example, if the downstream exhaust temperature exceeds a predetermined value or it exceeds the upstream exhaust temperature by more than a predetermined amount, then controller 32 may terminate the regeneration process.

Controller 32 may be configured to log faults when the downstream exhaust temperature exceeds a predetermined temperature or when the downstream exhaust temperature exceeds the upstream exhaust temperature by more than a predetermined amount. Controller 32 may also be configured to terminate the regeneration process if the number of faults reaches a predetermined value (e.g., when three faults have occurred).

System 16 may include a display 70. Display 70 may be located at any suitable location on machine 10, such as, for example, in operator station 11. Display 70 may be any kind of display, including screen displays, such as, for example, cathode ray tubes (CRTs), liquid crystal displays (LCDs), plasma screens, and the like. Display 70 may be configured to display information about operating parameters of system 16.

In one embodiment, display 70 may include a warning indicator 72 (e.g., a warning lamp, warning message, etc.). Controller 32 may be configured to illuminate warning indicator 72 upon detection of the predetermined amount of faults. As an alternative or in addition to display 70, system 16 may include one or more audible alerts for conveying information about operating parameters of system 16 to an operator. In addition to providing visual feedback regarding operating parameters of system 16, display 70 may also be configured to display other information regarding system 16 or any other device and/or system associated with machine 10. Display 70 may also be configured to indicate when a regeneration event is occurring or about to occur. Alternatively or additionally, display 70 may be configured to display information regarding the temperature profile being utilized for a regeneration event.

Controller 32 may be configured to control operation of heating system 26 during execution of a thermal regeneration event of particulate trap 19. Controller 32 may do so by performing a series of temperature increases followed by temperature holds. For example, controller 32 may be configured to effectuate a first temperature increase of the particulate trap at a predetermined rate up to a first predetermined temperature. Controller 32 may also be configured to effectuate a first temperature hold by maintaining the temperature of the particulate trap at the first predetermined temperature for a predetermined amount of time. Further, controller 32 may be configured to effectuate at least a second temperature increase of the particulate trap at a predetermined rate to a higher second predetermined temperature. In addition, controller 32 may be configured to effectuate at least a second temperature hold by maintaining the temperature of the particulate trap at the second predetermined temperature for a predetermined amount of time.

System 16 may be configured to perform more than two temperature increases and more than two temperature holds during the regeneration event. Controller 32 may be further configured to control the number of temperature increases during the regeneration event, the number of temperature holds performed during the regeneration event, and/or the overall duration of the regeneration event. Controller 32 may also be configured to control the rate of temperature increase during at least one of the temperature increases and/or the duration of at least one of the temperature holds. In addition, controller 32 may be configured to control operation of heating system 26 based on feedback from one or more sensing devices configured to monitor one or more parameters. Such parameters may include, for example, particulate accumulation in particulate trap 19; one or more operating parameters of system 16; and/or one or more operating parameters of engine 14.

Figure 3:
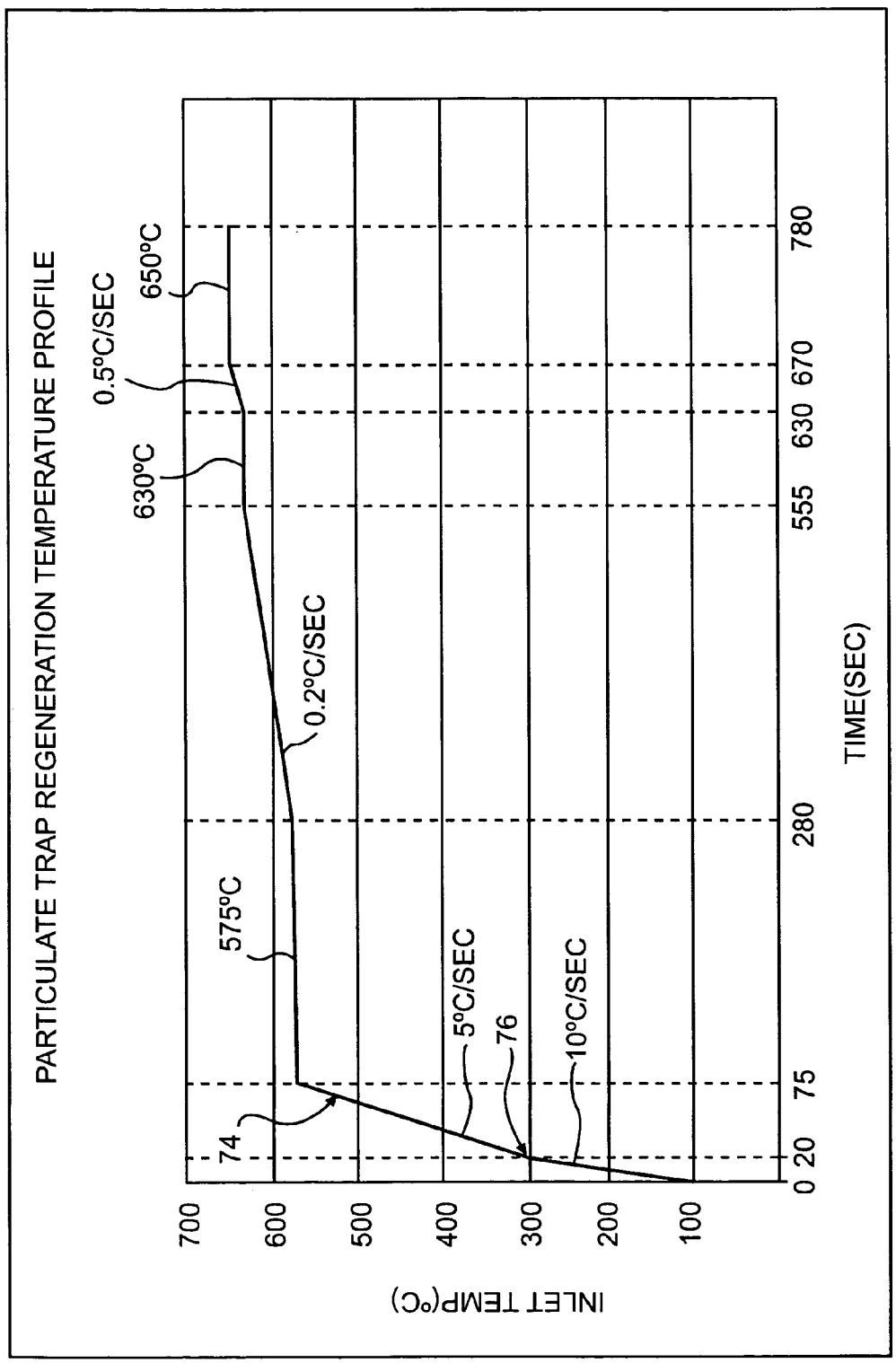
FIG. 3 is an exemplary particulate trap regeneration temperature profile for a thermal regeneration event according to an exemplary disclosed embodiment.

FIG. 3 illustrates an exemplary temperature profile 74 for a regeneration event. The temperatures illustrated in FIG. 3 represent inlet temperatures (i.e., temperatures taken at or near the inlet to particulate trap 19). However, the presently disclosed system may utilize temperature measurements from other locations that are indicative of the temperature of particulate trap 19. For example, temperature measurements may be taken inside particulate trap 19, downstream from particulate trap 19, and/or upstream from particulate trap 19.

Temperature profile 74, as illustrated in FIG. 3, may be for a 780 second regeneration event. At the beginning of the regeneration event, the inlet temperature may be around 100 degrees Celsius (° C.). For about the first 20 seconds, the temperature may be increased at about 10° C./sec (° C./sec), which may raise the temperature to about 300° C. at the 20 second mark. Between the 20 second mark and the 75 second mark, the rate of temperature increase may be about 5° C./sec, which may raise the temperature to about 575° C. The temperature may be held at 575° C. for about 205 seconds until the 280 second mark, at which point the temperature may be increased at a rate of 0.2° C./sec for another 275 seconds, which may bring the temperature up to about 630° C. at about the 555 second mark. The next temperature hold may maintain the inlet temperature at about 630° C. for another 75 seconds, until the 630 second mark, where the temperature may then be increased at about 0.5° C./sec. This rate of increase may be sustained for about 40 seconds, which may bring the temperature up to about 650° C. at the 670 second mark. A final temperature hold may be performed at 650° C. for about 110 seconds.

FIG. 3 illustrates constant rates of temperature increase, however, as an alternative, varying rates could be utilized under the scope of the presently disclosed system. For example, although FIG. 3 illustrates a slight change in the rate of temperature increase at a transition point 76 about 20 seconds into the regeneration event, the transition between these two rates of temperature increase may be more gradual (i.e., the graph may be curved). As yet another alternative, the entire profile between temperature holds (e.g., between 0-75 seconds, 200-555, and/or 630-670) may be curved. In some cases, such a curve may have a constant radius. In other cases such a curve may have a variable radius (e.g., increasing or decreasing radius). In some embodiments, the curves may be hyperbolic, logarithmic, or any other type of non-linear shape.

Further, the temperature "holds" may actually include slight variations in the temperature of particulate trap 19. For example, a very slow rate of temperature increase or temperature decrease (e.g., less than about 0.1° Celsius per second) may achieve the same result as maintaining a constant temperature (i.e., ensuring stability of the incineration process during a regeneration event), and therefore may fall within the scope of the term "temperature hold" as used herein. Once the temperature of particulate trap 19 is raised to a predetermined temperature, performing a temperature hold may include maintaining the temperature the same or increasing or decreasing the temperature slightly (e.g., less than about 0.1° Celsius per second). Similarly, the rates of temperature increase may vary slightly from those disclosed. The duration of the temperature increases and/or the duration of the temperature holds may vary slightly from those disclosed. Further, the temperature at which the holds are performed may vary slightly within the scope of the present disclosure.

Such a ramp-and-hold type profile may be custom tailored for different sizes or types of engines and/or particulate traps/filter mediums. Different systems may utilize a shorter or longer version of the presently disclosed temperature profile. For example, a 630 second regeneration event may only utilize the first 630 seconds of the temperature profile illustrated in FIG. 3. Alternatively, the temperature profile shown in FIG. 3 may be condensed such that the whole profile will be completed in 630 seconds instead of 780 seconds as shown. Such condensing may be accomplished by shortening the duration of the temperature increases (i.e., higher rates of temperature increase), shortening the duration of the temperature holds, or various combinations of both.

Variations of the temperature profile illustrated in FIG. 3, such as those discussed above may be utilized with system 16. Such variations may be determined at the time a regeneration event is triggered and may depend on the amount of particulates estimated or measured to be accumulated in filter medium 24. The variations of the temperature profile may be made automatically by system 16 and/or may be made manually by an owner, operator, or other party interested in the operation of machine 10.

Figure 4:
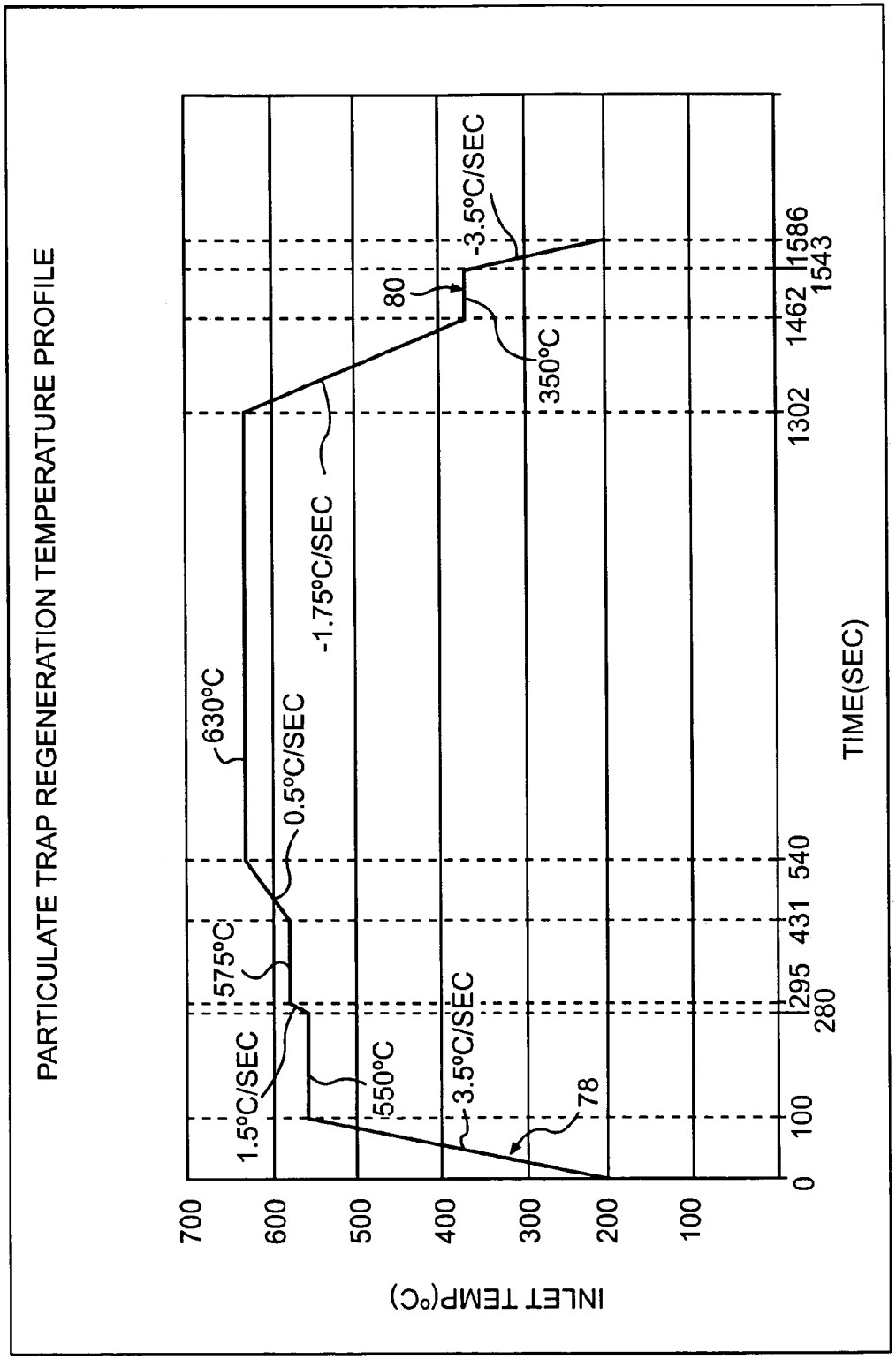
FIG. 4 is a second exemplary particulate trap regeneration temperature profile for a thermal regeneration event according to an exemplary disclosed embodiment.

FIG. 4 illustrates a second exemplary temperature profile 78 for a regeneration event. At the beginning of the regeneration event, the inlet temperature may be around 200° C. For about the first 100 seconds, the temperature may be increased at about 3.5° C./sec, which may raise the temperature to about 550° C. at the 100 second mark. The temperature may be held at 550° C. for about 180 seconds until the 280 second mark, at which point the temperature may be increased at a rate of about 1.5° C./sec for about another 15 seconds, which may bring the temperature up to about 575° C. at the 295 second mark.

The next temperature hold may maintain the inlet temperature at about 575° C. for about another 136 seconds, until the 431 second mark, where the temperature may then be increased at about 0.5° C./sec. This rate of increase may be sustained for about 109 seconds, which may bring the temperature up to about 630° C. at the 540 second mark. The temperature may then be held at 630° C. for about 762 seconds, bringing the procedure to the 1302 second mark.

At the 1302 second mark, a post-regeneration recovery process may begin. The recovery process may include a temperature decrease, wherein the temperature may drop by about 1.75° C./sec. This temperature decrease may be sustained for about 160 seconds, bringing the temperature down to about 350° C. at the 1462 second mark. A recovery temperature hold 80 may be executed at 350° C., for about 81 seconds, until about the 1543 second mark. Beginning at about the 1543 second mark, another temperature decrease may be executed, wherein the temperature may drop at a rate of 3.5° C./sec. This temperature decrease may continue until the 1586 second mark bringing the temperature back down to about 200° C.

INDUSTRIAL APPLICABILITY

The disclosed particulate trap regeneration temperature control system 16 may be suitable to enhance exhaust emissions control for engines. System 16 may be used for any application of an engine. Such applications may include supplying power for machines, such as, for example, stationary equipment such as power generation sets, or mobile equipment, such as vehicles. The disclosed system may be used for any kind of vehicle, such as, for example, automobiles, construction machines (including those for on-road, as well as off-road use), and other heavy equipment.

In order to prevent uncontrollable soot oxidation reactions, the presently disclosed system may employ a gradual, incremental temperature increase control strategy for regeneration (a "ramp-and-hold" strategy). By employing a ramp-and-hold strategy, the disclosed system may avoid inputting too much heat into the particulate trap too quickly. In addition to carefully selected rates of temperature increase, the discloses strategy also employs temperature holds for various durations, which may allow the soot oxidation reaction some time to stabilize after temperature increases.

The disclosed strategy may employ various rates of temperature increase. In the embodiment shown in FIG. 3, the strategy may include fairly rapid temperature increases at the beginning of the regeneration event to get the temperature of the particulate trap closer to a temperature range more conducive to soot oxidation. Less aggressive temperature increases may be implemented toward the middle of the regeneration event as the temperature approaches and remains within the aforementioned range. Ultimately more rapid temperature increases may be employed, in some cases for shorter durations, as the regeneration event nears its conclusion. Near the conclusion of the regeneration event, the amount of particulate matter in the particulate trap will have been significantly reduced and the possibility of the soot oxidation reaction becoming unstable will, therefore, have been correspondingly reduced. In some embodiments the rate of temperature decrease ("recovery") at the end of a regeneration event may be controlled, as illustrated in FIG. 4. Rather than allowing the temperature of particulate trap 19 to come down at a natural rate, heating system 26 may be utilized to slow the rate of temperature decrease and/or to execute a recovery temperature hold 78 as shown in FIG. 4.

In some embodiments, the system may be configured to activate regeneration device 28 when more than one trigger condition is met. For example, the system may wait until both a particulate loading threshold and a time-based trigger condition are met before initiating a regeneration event. In other embodiments, the system may be configured to initiate a regeneration event when the first of multiple possible trigger conditions is met.

The following is a description of an exemplary system that is configured to initiate a regeneration event when the first of multiple possible trigger conditions is met. In such a system, for example, a simple time trigger (e.g., engine operation time) may provide the utmost reliability as no physical characteristics need to be sensed to monitor such a trigger condition. However, depending on other factors, particulate loading in particulate trap 19 may reach a level warranting regeneration at an earlier time than the interval at which the time trigger is set. In order to prevent damage that could result from such a situation, a backpressure or pressure differential trigger may be configured to monitor for relatively higher levels of particulate loading. Thus, in such cases where particulate loading has prematurely reached a high level, a backpressure or pressure differential trigger may trigger regeneration to remedy excessive particulate loading even before a time trigger condition is met.

If, for whatever reason, particulate loading has prematurely reached a high level, but has not caused a significant increase in backpressure, an actual particulate loading monitoring system may detect the actual amount of particulate matter accumulated in filter medium 24. That is, system 16 may, in some embodiments, be configured to measure the amount of particulates accumulated in particulate trap 19 and initiate a regeneration event if the amount of particulates accumulated in particulate trap 19 is above a predetermined threshold level.

If, however, neither the backpressure trigger, nor the particulate loading monitoring system successfully detect excessive particulate loading in a given circumstance, then the time trigger may serve to insure that regeneration occurs at relatively conservative intervals. Further, regeneration may be triggered manually if, for whatever reason, no other trigger conditions are determined to be met, but an operator, owner, service technician, etc. deems that a regeneration may be appropriate based on their own observations.

An exemplary method of regenerating particulate trap 19 may include executing a thermal regeneration event. Executing the thermal regeneration event may include performing a first temperature increase of particulate trap 19 at a predetermined rate up to a first predetermined temperature and performing a first temperature hold by maintaining the temperature of particulate trap 19 at the first predetermined temperature for a predetermined amount of time. Executing the thermal regeneration event may also include performing at least a second temperature increase of particulate trap 19 at a predetermined rate to a higher, second predetermined temperature and performing at least a second temperature hold by maintaining the temperature of particulate trap 19 at the second predetermined temperature for a predetermined amount of time.

Such a method may further include performing more than two temperature increases and/or more than two temperature holds during the regeneration event. The method may include controlling at least one of the following: the number of temperature increases during the regeneration event; the number of temperature holds performed during the regeneration event; and/or the overall duration of the regeneration event. In addition, the method may include controlling the rate of temperature increase during at least one of the temperature increases and/or the duration of at least one of the temperature holds.

The method may also include controlling operation of heating system 26 based on feedback from one or more sensing devices configured to monitor at least one of the following: particulate accumulation in particulate trap 19; one or more operating parameters of system 16; and one or more operating parameters of engine 14.

The temperature increases may be made by applying heat to particulate trap 19 and/or by heating exhaust gases upstream of particulate trap 19, or by other known methods. For example, the temperature increases may be effectuated by burner assembly 30, which, as discussed in greater detail above, may be configured to increase the temperature of particulate trap 19 and/or exhaust gases upstream from particulate trap 19. Alternatively the temperature increases may be effectuated by controlling the temperature of the exhaust delivered to particulate trap 19. Controlling the temperature of the exhaust delivered to particulate trap 19 may be executed by controlling one or more operating parameters of engine 14 to thereby control the temperature of the exhaust produced by engine 14. Such operating parameters may include air/fuel ratio, engine speed, timing, and/or exhaust valve actuation, etc.

It will be apparent to those having ordinary skill in the art that various modifications and variations can be made to the disclosed particulate trap regeneration temperature control system without departing from the scope of the invention. Other embodiments of the invention will be apparent to those having ordinary skill in the art from consideration of the specification and practice of the invention disclosed herein. It is intended that the specification and examples be considered as exemplary only, with a true scope of the invention being indicated by the following claims and their equivalents.

What is claimed is:

1. A particulate trap regeneration temperature control system, comprising:
    a particulate trap configured to remove one or more types of particulate matter from an exhaust flow of an engine;
    a heating system configured to increase the temperature of the particulate trap;
    a controller configured to control operation of the heating system during execution of a thermal regeneration event of the particulate trap by:
        effectuating a plurality of temperature increases and a plurality of temperature holds, including
            a first temperature increase of the particulate trap at a first predetermined rate up to a first predetermined temperature;
            a first temperature hold by maintaining the temperature of the particulate trap at a predetermined temperature greater than or equal to the first predetermined temperature for a first predetermined amount of time;
            a second temperature increase of the particulate trap at a second predetermined rate to a second predetermined temperature which is greater than the predetermined temperature at the first temperature hold, wherein the first predetermined rate is between ten and fifty times faster than the second predetermined rate; and
            a second temperature hold by maintaining the temperature of the particulate trap at the second predetermined temperature for a second predetermined amount of time.

2. The system of claim 1, wherein the system is configured to perform more than two temperature increases and more than two temperature holds during the regeneration event.

3. The system of claim 1, wherein the first predetermined amount of time is greater than the second predetermined amount of time.

4. The system of claim 1, wherein the first predetermined rate is one of ten times, twenty times, twenty five times, or fifty times faster than the second predetermined rate.

5. The system of claim 1, wherein the predetermined temperature at the first temperature hold is about 575 degrees Celsius.

6. The system of claim 1, wherein the first predetermined amount of time of the first temperature hold is about 205 seconds.

7. The system of claim 1, wherein the second predetermined rate is between 0.2 degrees Celsius per second and 0.5 degrees Celsius per second.

8. The system of claim 7, wherein the second predetermined rate is 0.5 degrees Celsius per second.

9. The system of claim 7, wherein the second predetermined rate is 0.2 degrees Celsius per second.

10. The system of claim 1, wherein the first predetermined rate is greater than or equal to about 5 degrees Celsius per second.

11. The system of claim 1, wherein the first predetermined rate is about 10 degrees Celsius per second.

12. The system of claim 1, wherein the predetermined temperature at the first temperature hold is equal to the first predetermined temperature.

13. The system of claim 1, wherein the controller is further configured to effectuate an increase in temperature of the particulate trap from the first predetermined temperature to the predetermined temperature at the first temperature hold at an intermediate ramp rate which is lower than the first predetermined rate.

14. A particulate trap regeneration system, comprising:
    a particulate trap configured to remove one or more types of particulate matter from an exhaust flow of an engine;
    a heating system configured to increase the temperature of the particulate trap;
    a controller configured to control operation of the heating system during execution of a thermal regeneration event of the particulate trap by:
        heating the particulate trap at a first ramp rate to a first predetermined temperature;
        maintaining the particulate trap at a first hold temperature for a first time period, the first hold temperature being greater than or equal to the first predetermined temperature;
        heating the particulate trap from the first hold temperature to a second hold temperature at a second ramp rate different from the first ramp rate, the second hold temperature being greater than the first hold temperature;
        maintaining the particulate trap at the second hold temperature for a second time period;

heating the particulate trap from the second hold temperature to a third hold temperature at a third ramp rate which is different from the first and second ramp rates; and maintaining the particulate trap at the third hold temperature for a third time period.

15. The system of claim 14, wherein a ratio of the first ramp rate to the second ramp rate is one of 25° C./sec and 50° C./sec.

16. The system of claim 14, wherein the first hold temperature is equal to the first predetermined temperature.

17. The system of claim 14, further including heating the particulate trap from the first predetermined temperature to the first hold temperature at an intermediate ramp rate which is different from the first ramp rate.

18. A particulate trap regeneration system, comprising:
a particulate trap configured to remove one or more types of particulate matter from an exhaust flow of an engine;
a heating system configured to increase the temperature of the particulate trap;
a controller configured to control operation of the heating system during execution of a thermal regeneration event of the particulate trap by:
heating the particulate filter to a first hold temperature;
maintaining the particulate filter at a first hold temperature for a first time period;
heating the particulate filter from the first hold temperature to a second hold temperature, the second hold temperature being higher than the first hold temperature;
maintaining the particulate filter at a second hold temperature for a second time period, the second time period being less than the first time period;
heating the particulate filter from the second hold temperature to a third hold temperature, the third hold temperature being higher than the second hold temperature; and
maintaining the particulate filter at the third hold temperature for a third time period, the third time period being longer than the second time period.

19. The system of claim 18, wherein the first time period is at least twice as long as the second time period.

* * * * *